Patented Jan. 31, 1933                                            1,895,910

UNITED STATES PATENT OFFICE

ARTHUR EVAN BOSS, OF FAIRLAWN, OHIO, ASSIGNOR TO THE B. F. GOODRICH COMPANY, OF NEW YORK, N. Y., A CORPORATION OF NEW YORK

RUBBER COMPOSITION

No Drawing.            Application filed May 25, 1932. Serial No. 613,549.

This invention relates to the compounding of rubber and particularly to the preparation of certain novel rubber compositions.

Certain lead compounds such as litharge (lead monoxide), white lead (basic lead carbonate), chrome yellow (lead chromate) and even certain organic salts of lead have heretofore been incorporated into rubber for coloring the rubber or for the purpose of accelerating its vulcanization. The only one of these lead compounds which now finds any extended use in the rubber industry is litharge, which is used as an accelerator of vulcanization. The use of litharge is, however, attended by some serious disadvantages, chief of which are the large particle size and non-uniformity of the commercially available pigment.

This invention accordingly consists in incorporating into rubber a novel lead pigment, namely a finely divided lead silicate. This substance can be prepared with a very fine and uniform particle size. It is readily incorporated into rubber to give a product having unusually desirable physical properties, including high tensile strength, and a high degree of resistance to deterioration and to wear.

A convenient method for preparing the lead silicate is as follows: 1095 parts by weight of hydrated, crystalline lead acetate are dissolved in 28000 parts of water and 1280 parts of water glass are stirred into the solution. The water glass may be a commercial product of specific gravity between 1.40 and 1.48, with a ratio of silica to soda of about 3, and containing approximately 40% of anhydrous sodium silicate. If a water glass of a different concentration or with a different silica-soda ratio is employed, it may be desirable to change the proportions somewhat. The precipitated lead silicate is filtered, the filter cake is frozen and thawed again to diminish the gelatinous nature of the precipitate, and finally washed first with water and then with alcohol. The alcohol remaining in the washed precipitate helps to dehydrate the product and produce a friable mass which readily crumbles to an impalpable powder. Methyl and butyl alcohols are preferred for this purpose, but any other alcohol which is sufficiently volatile and appreciably water-soluble may be substituted therefor if desired. The product upon drying to eliminate the water and alcohol is ready for use. It is a white powder of specific gravity 4.17 and with a remarkably small and uniform particle size.

The lead silicate may be incorporated into any desired type of rubber composition except pure white or light-colored compositions. For example 100 parts by weight of rubber may be mixed with 10 parts of the precipitated lead silicate, 5 parts of sulphur, and 2 parts of stearic acid. The composition after vulcanization in a mold at 287° F. exhibits the following physical properties, the tensile strength being given in pounds per square inch:

| Time vulcanized | Tensile strength | Elongation |
|---|---|---|
| 30 min. | 3120 | 710 |
| 45 min. | 3200 | 725 |
| 60 min. | 3260 | 755 |

The rubber vulcanizes rapidly and without appreciable tendency toward over-vulcanization, even after a prolonged heating. Its tensile strength is high, and its specific gravity is low, because of the relatively low specific gravity of the lead silicate pigment. Because of its very fine particle size, the lead pigment is readily and uniformly dispersed throughout the rubber, and a comparatively small quantity is sufficient to induce a rapid and uniform vulcanization of the rubber, whether vulcanized in a mold, in steam, or in hot air. It gives equally good results in the presence of the usual rubber compounding ingredients, including reenforcing pigments, fillers, organic accelerators of vulcanization, softeners, etc., and may even be used in the manufacture of hard rubber or ebonite.

The extremely fine particle size of the precipitated pigment, together with the comparatively low specific gravity, is particularly advantageous for the reason that a given weight of pigment contains an exceedingly large number of particles. The pigment may therefore be incorporated into the rubber in such a manner as to assure the presence of the lead compound intimately distributed throughout the entire mass of the rubber.

It is to be understood that the description of specific embodiments of the invention is illustrative only, and that the invention is not limited to such specific embodiments. In particular, the lead silicate may be prepared by other methods than that described, for example by precipitating another soluble lead salt such as lead nitrate with any soluble silicate. The invention is accordingly to be limited only as may be required by the prior art and as indicated in the appended claims.

I claim:

1. A rubber composition comprising a finely divided lead silicate.

2. A rubber composition comprising a finely divided precipitated lead silicate.

3. A composition comprising rubber, a vulcanizing agent, and a finely divided precipitated lead silicate.

4. A composition comprising rubber, sulphur, and a finely divided precipitated lead silicate.

5. A vulcanized rubber composition which has been vulcanized in the presence of a finely divided precipitated lead silicate.

6. A vulcanized rubber composition resulting from the vulcanization of a mixture of rubber sulphur, and a finely divided precipitated lead silicate.

7. The method of vulcanizing rubber which comprises heating a mixture of rubber, sulphur and a finely divided precipitated lead silicate.

In witness whereof I have hereunto set my hand this 17th day of May, 1932.

ARTHUR EVAN BOSS.